J. G. BURNS.
MEDICATED EGG.
APPLICATION FILED APR. 12, 1917.

1,229,881.

Patented June 12, 1917.

WITNESSES
Oliver W. Holmes
C Bradway

INVENTOR
J.G. Burns
BY
ATTORNEYS

UNITED STATES PATENT OFFICE.

JOHN G. BURNS, OF PULASKI, TENNESSEE.

MEDICATED EGG.

1,229,881. Specification of Letters Patent. Patented June 12, 1917.

Application filed April 12, 1917. Serial No. 161,490.

*To all whom it may concern:*

Be it known that I, JOHN G. BURNS, a citizen of the United States, and a resident of the city of Pulaski, in the county of Giles and State of Tennessee, have invented a new and Improved Medicated Egg, of which the following is a full, clear, and exact description.

This invention relates to nest eggs, and particularly to that type designed to hold a liquid louse or mite exterminator which works its way from an interior chamber to the surface.

The general objects of the present invention are to provide a nest egg made of a new composition and by a new method whereby sufficient porosity is obtained to permit the liquid disinfectant to pass through the walls to the surface of the egg.

For a more complete understanding of the invention reference is to be had to the following description and claims taken in connection with the accompanying drawing which illustrates one embodiment of the invention and wherein similar reference characters are employed to designate corresponding parts.

In the accompanying drawing

Figure 1:
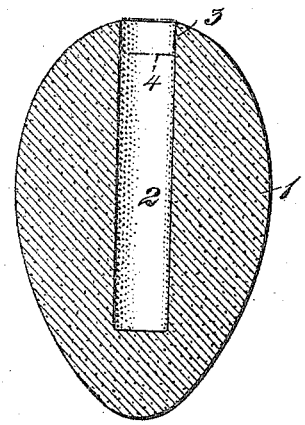
Figure 1 is a longitudinal section of the nest egg.
Figure 2:
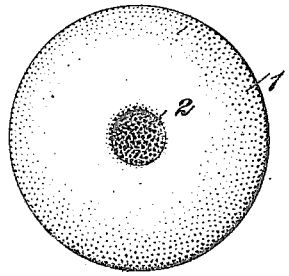
Fig. 2 is an end view thereof.

Referring to the drawing 1 designates the body of the egg which is molded with a central chamber 2 adapted to hold a liquid for killing lice and mites, the chamber being open at the end 3 so that the liquid and absorbent cotton, or other carrier, may be placed therein, and after the egg is thus charged the end is closed by a cork 4 indicated by the dotted lines.

The composition of which the egg is molded is of such a nature that in solidifying the walls of the egg are sufficiently porous to permit the liquid to gradually work to the surface so that the egg will be effective for a long time before it will have to be recharged, and at the same time the egg is of light and durable texture.

The mixture of which the egg is made consists of 5 parts of plaster of Paris and two parts of Portland cement made into a plastic material by the addition of water in which may be dissolved one dram of copperas to each quart of water, the copperas serving the purpose of a disinfectant by giving off odor when heated by the laying or setting fowl, and as an agent to prevent the hardening of the body of the egg. To this plastic mixture of cement and plaster of Paris may be added flour of sulfur in the proportion of two parts of sulfur to five parts of the mixture. This resultant material is employed to form the body of the egg, which is shaped in a suitable mold. After the mold is filled a wooden plunger is inserted so as to mold the liquid containing chamber. The plunger is preferably made of soft wood and before being inserted in the plastic material is dipped in a thick solution of country lye soap, and this coated plunger is allowed to remain in the egg until the plastic material becomes well set. By this means a sufficient amount of soap, or the ingredients thereof acts upon the inner walls of the egg in such a manner as to make the walls porous to a very marked degree. The plunger being of soft wood is advantageous for the reason that it retains the soap ingredients and liberates itself from the interior of the egg in the drying out process. The sulfur contributes to render the egg lighter in weight and more efficient since it is a disinfectant giving off the sulfurous fumes under the heat of the laying fowl.

Having thus described my invention I claim as new, and desire to secure by Letters Patent,

1. The herein described process of making medicated eggs consists in mixing a suitable plaster composition and forming a chamber therein by the insertion of a plunger coated with a soapy solution.

2. The herein described process of making a medicated nest egg which consists in molding suitable plastic composition in the shape of an egg, inserting into the material a wooden chamber forming plunger coated with a soapy material, and allowing the plunger to remain until the said plastic material sets.

3. The herein described process of making medicated eggs which consists in preparing a suitable plastic composition, molding the same into an egg form, and inserting into the plastic material a plunger coated with material which makes the plastic material porous in drying.

4. A medicated nest egg made of plaster of Paris, cement and flour of sulfur.

5. A medicated nest egg comprising an egg shaped body having a liquid containing chamber, and the walls of the chamber being porous to permit the liquid to work to the surface of the egg, said body being made of cement, plaster of Paris and sulfur, made plastic by the addition of water containing copperas.

6. A medicated nest egg formed of a plastic material, molded in the shape of an egg body and having a liquid containing chamber, said body being formed of cement, and plaster of Paris and a small quantity of soapy material to render the walls of the chamber porous.

JOHN G. BURNS.

Copies of this patent may be obtained for five cents each, by addressing the "Commissioner of Patents, Washington, D. C."